United States Patent [19]

Toole

[11] 3,916,084

[45] Oct. 28, 1975

[54] COMPACT-BI-PHASE PULSE CODED MODULATION DECODER

[75] Inventor: Pierce C. Toole, Cocoa, Fla.

[73] Assignee: The United States of America as represented by the National Aeronautics and Space Administration, Washington, D.C.

[22] Filed: Dec. 26, 1974

[21] Appl. No.: 536,535

[52] U.S. Cl. ................ 178/69.5 R; 178/88; 328/63; 328/190

[51] Int. Cl.$^{2}$ ........................ H04L 7/00; H03K 1/17

[58] Field of Search ............ 178/69.5 R, 88; 328/63, 328/190, 191, 193, 195, 196, 201; 307/208, 269

[56] References Cited

UNITED STATES PATENTS

| | | | |
|---|---|---|---|
| 3,593,044 | 7/1971 | McNeilly et al. | 178/69.5 R |
| 3,663,883 | 5/1972 | Olso | 178/69.5 R |

*Primary Examiner*—Malcolm A. Morrison
*Assistant Examiner*—Errol A. Krass
*Attorney, Agent, or Firm*—James O. Harrell; John R. Manning

[57] ABSTRACT

An apparatus for extracting and generating a clock pulse train from a pulse coded data train. The apparatus includes a filter circuit for receiving the pulse coded data train. A first set-reset flip-flop is provided for receiving the signals from the pulse coded train. Coupled to the output of the first flip-flop is a means for generating a triggering pulse responsive to the occurrence of data within the train. A pulse gate activated by said triggering pulse for causing the data from said pulse coded data train to be stored in a second flip-flop. A clock pulse generating means is coupled between the outputs of the first and second flip-flops for generating a continuous stream of clock pulses which are synchronized with the incoming pulse coded data train.

4 Claims, 2 Drawing Figures

COMPACT-BI-PHASE PULSE CODED MODULATION DECODER

ORIGIN OF THE INVENTION

The invention described herein was made by an employee of the United States Government, and may be manufactured and used by or for the Government for governmental purposes without the payment of any royalties thereon or therefor.

BACKGROUND OF THE INVENTION

This invention relates to a compact bi-phase pulse coded modulation decoder, and more particularly to an apparatus for extracting data and a clock pulse from a pulse coded modulated data train.

One of the problems of utilizing pulse coded modulated information in the form of data for transmitting data and the like is that it is necessary to have a synchronized clock signal transmitted therewith so as to identify the information in the train. Normally, an external clock pulse is generated locally and synchronized for subsequent comparison with the pulse coded modulated data train so as to detect the binary information stored therein. One problem encountered in utilizing a locally generated clock pulse is that sometime a clock pulse train will slip phase. This problem is not inherent in a biphase data train since the clock pulse train is encoded within the information train.

SUMMARY OF THE INVENTION

The instant invention relates to an apparatus which extracts data and a clock pulse from a pulse coded data train with the extracted clock pulse being synchronized with the pulse coded data train. The apparatus includes a filter circuit for receiving the pulse coded data. Connected to the output of the filter circuit is a first set reset flip-flop which receives the signals corresponding to the data train from the filter. The first set-reset flip-flop has a Q and $\overline{Q}$ output. A pulse gate having a pair of inputs, a pair of outputs and a trigger input is provided. The inputs of the pulse gate are coupled to the Q and $\overline{Q}$ outputs of the first set-reset flip-flop. Circuitry is provided between the Q and $\overline{Q}$ outputs of the first set reset flip-flop and a trigger input of the pulse gate for generating and supplying a gating pulse to the trigger input each time a change in data appears in the data train. A second set-reset flip-flop is provided for receiving the signals gated through the pulse gate and generating signals on its output corresponding to the data included in the pulse coded data train. A clock pulse generating circuit is coupled to the output of the first and second set-reset flip-flops generating clock pulses that are synchronized with the pulse coded data train.

Therefore the apparatus extracts data as well as clock pulses from a pulse coded data train.

Accordingly, it is an important object of the present invention to provide a circuit for extracting and generating a clock pulse train from a pulse coded data train.

Another important object of the present invention is to provide a circuit for generating a clock pulse train from a biphase data train so that the information contained within the biphase data train can be removed therefrom with the clock and data being in phase.

These and other objects and advantages of the invention will become apparent upon reference to the specification, attendant claims and drawing.

DESCRIPTION OF A PREFERRED EMBODIMENT

Figure 1:
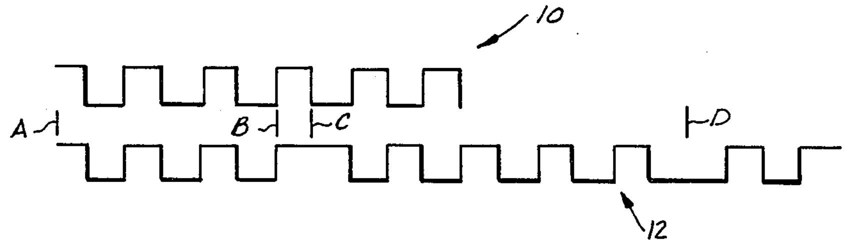
FIG. 1 is a schematic representation of a clock pulse train and a biphase data train.

Referring in more detail to the drawing as illustrated in FIG. 1, there is shown a clock pulse train generally designated by the reference character 10 and a biphase data train generally designated by the reference 12. The clock pulse train 10 is normally generated by a locally synchronized clock so that such can be compared with the information contained in the data train 12 for extracting the information therefrom. When the clock pulses 10 are generated from a local source, it can be seen by visualizing the clock pulse train 10 and the biphase data train 12 that if there is a slip in phase the information will be either incorrect or lost.

Figure 2:
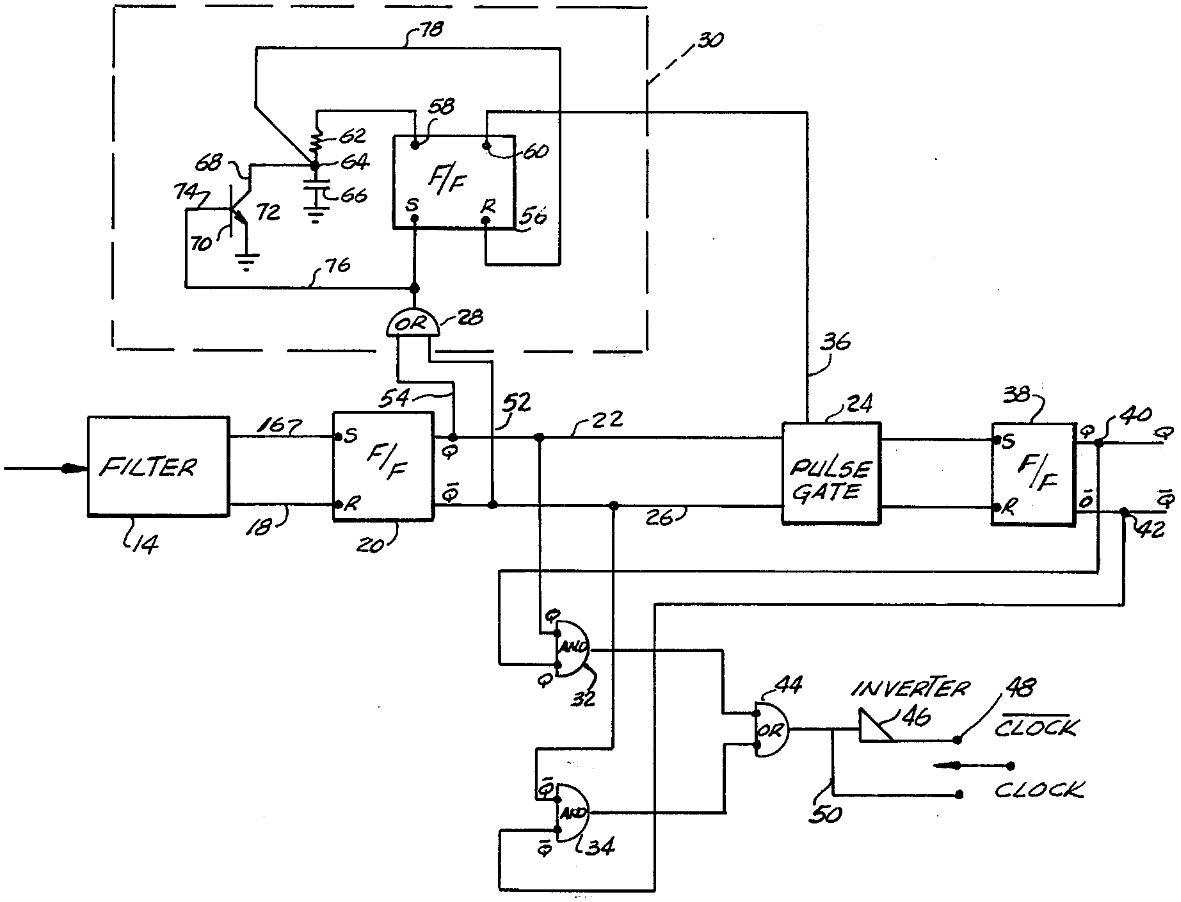
FIG. 2 is a schematic diagram of a circuit constructed in accordance with the present invention for extracting clock pulses and data from a biphase data train.

The circuit illustrated in FIG. 2 is designed to generate a clock pulse train from the biphase data train 12 so as to avoid synchronization problems and subsequent loss of information as encountered when you use a local clock.

The biphase data train 12 is fed into a filter circuit 14 for being conditioned to operate a set-reset flip-flop. The information is fed out of the filter 14 over a pair of output leads 16 and 18 to a set and reset input of a set-reset flip-flop 20. The set-reset flip-flop 20 has a Q and $\overline{Q}$ output. The Q output is coupled by lead 22 to one input of a pulse gate 24. The $\overline{Q}$ output 26 is connected to another input of a pulse gate 24.

The Q and $\overline{Q}$ outputs are also fed through an Or gate 28 to a set input of a retriggerable one-shot multivibrator 30. The Q and $\overline{Q}$ outputs of flip-flop 20 are also fed, respectively, to one inputs of AND gates 32 and 34 which form part of a circuit for generating a clock signal.

Whenever there is a signal coming in on lead 36 to the pulse gate 24 from the retriggerable one-shot multivibrator 30, such allows the Q and $\overline{Q}$ signals appearing on leads 22 and 26 to pass through the pulse gate to either set or reset a second flip-flop 38. The flip-flop 38 is set in accordance with the status of flip-flop 20 producing outputs on the Q and $\overline{Q}$ output leads labeled 40 and 42. The information appearing on output leads 40 and 42 is the data that was contained in the biphase data train 12. The Q and the $\overline{Q}$ signals from the flip-flop 38 are fed to the other inputs of the AND gates 32 and 34 for enabling the AND gates to generate the proper phase of the clock signal that was encoded in the biphase data train 12. The outputs of AND gates 32 and 34 are fed through an OR gate 44 through an invertor 46 to produce a not clock pulse at point 48 or it can be fed over lead 50 coupled to the output of OR gate 44 for generating a clock pulse signal.

In order to supply an enable pulse on lead 36 to the pulse gate 24 for removing the data from the data train and storing such in the flip-flop 38, the retriggerable one-shot multivibrator 30 is utilized. The retriggerable one-shot multivibrator 30 has a pair of inputs 52 and 54 which are coupled, respectively to the $\overline{Q}$ and Q outputs of flip-flops 20. The inputs 52 and 54 are fed through an OR gate 28 to a set input of a conventional set-reset flip-flop 56. The flip-flop 56 has a pair of outputs 58 and 60. Output 58 is coupled through a resistor 62 to a junction 64. Connected on the opposite side of the junction 64 from the resistor 62 is a capacitor 66. The other side of the capacitor 66 is coupled to ground. Also connected to the junction 64 is a collector electrode 68 of an NPN transistor 70. An emitter electrode 72 of the NPN transistor 70 is coupled to ground. A base electrode 74 of the NPN transistor is coupled through leads 76 back to the set input of the set-reset flip-flop 56. Also coupled to a junction 64 by lead 78 is the reset input of the flip-flop 56 so that the flip-flop 56 will be reset after a predetermined period of time for enabling the pulse gate 24.

The purpose of the retriggerable one-shot multivibrator 30 is to generate a gating pulse 36 each time a change in data appears in the biphase data train. For example, referring to the data train 12 at point C in the data train, a data transition occurs which is represented by a change in phase of a pulse. This data is represented by failing to make a transition from one phase to the other at point C. It is imperative that the retriggerable one-shot multivibrator be reset each time such a transition occurs in order to insure that the information coming out of flip-flop 20 is passed through the pulse gate 24 to be stored in the flip-flop 38. At this point, that is the transition point shown at C, the retriggerable one-shot multivibrator 30 will time out supplying an enable signal on lead 36 to the pulse gate 24.

The manner in which the one-shot multivibrator 30 operated is as follows: information is fed from either the Q or Q inputs through OR gate 28 to the set input of flip-flop 56. This causes a signal to appear on output lead 58 which is fed through resistor 62 to start charging capacitor 66. If no other signal appears once the capacitor is built up to a predetermined level, it is fed through lead 78 back to the reset input of the flip-flop 56 resetting the flip-flop. When the flip-flop is reset one-shot multivibrator, 30 generates an enable signal over lead 36. When the pulse gate 24 is enabled, the information in flip-flop 20 will be transferred to flip-flop 38 which produces an output signal on leads 40 and 42 showing the data change.

The circuitry including the transistor 70 is provided for dumping the charge built up on capacitor 66 if a signal appears on the output leads Q and $\overline{Q}$ of flip-flop 20 prior to the capacitor 66 building up to a predetermined level at which time the flip-flop 56 is reset to generate the enable signal. The charge time of the capacitor 66 is greater than a half-cycle of the data train 12 and less than a full cycle. Therefore, by insuring that the flip-flop 56 is set at the beginning of each transition, such will ensure that the enable pulse will be generated at the correct time.

The manner in which the clock signals are removed from the biphase data train is as follows. For example, between points A and B of the data train 12, the AND gate 32 will be enabled so as to pass clock pulses at the frequency of the re-occurring Q signal on the output of flip-flop 20. These clock pulses are fed through OR gate 44 to the outputs 48 and 50. However, at point C of the data train, a transition does not occur at the Q output of flip-flop 20. When the transition at point C fails to occur, the one-shot multivibrator 30 times out and enables the pulse gate 24. This permits the information contained in the flip-flop 20 to pass through the pulse gate to be stored in the flip-flop 38. Now, there is an output on the $\overline{Q}$ output 42 of the flip-flop 38. This output is fed to the not-input of AND gate 34. Simultaneously, a signal appears on the not-input of flip-flop 20 which is coupled to AND gate 34 for enabling AND gate 34. The output of AND gate 34 is fed through the OR gate 44, to the output 48, through inverter 46, and to the output 50 to produce the synchronized clock pulse signals.

While a preferred embodiment of the invention has been described using specific terms, such description is for illustrative purposes only, and it is to be understood that changes and variations may be made without departing from the spirit or scope of the following claims.

What is claimed is:

1. An apparatus for extracting and generating a clock pulse train from a pulse coded data train comprising:

a. a filter circuit for receiving said pulse coded data train;

b. a first set-reset flip-flop coupled to an output of said filter circuit for receiving signals corresponding to said data train therefrom, said first flip-flop having a Q and $\overline{Q}$ output;

c. a pulse gate having a pair of inputs, a pair of outputs and a trigger input, said inputs being coupled to said Q and $\overline{Q}$ outputs of said first set-reset flip-flop;

d. means coupled between said Q and $\overline{Q}$ outputs of said first set-reset flip-flop and said trigger input of said pulse gate for generating and supplying a gating pulse to said trigger input each time a change in data appears in said data train;

e. a second set-reset flip-flop having a pair of inputs coupled to said pair of outputs of said pulse gate and Q and $\overline{Q}$ outputs so that said pulse gate gates signals from said Q and $\overline{Q}$ outputs of said first flip-flop to said Q and $\overline{Q}$ outputs of said second flip-flop each time a change of data appears in said data train;

f. a clock pulse generating means coupled to said Q and $\overline{Q}$ outputs of said first flip-flop, and to said Q and $\overline{Q}$ outputs of said second set-reset flip-flop for generating a sequential chain of clock pulses.

2. The apparatus as set forth in claim 1 wherein: said clock pulse generating means includes;

a. a first and second AND gate each having a pair of inputs and an output;

b. means for coupling said Q outputs of said first and second flip-flop to said inputs of said first AND gate;

c. means for coupling said $\overline{Q}$ outputs of said first and second flip-flop to said inputs of said second flip-flop, and d. an OR gate having an output and a pair of inputs each of which is coupled to an output of said first and second AND gate;

whereby said clock pulses appear on said output of said OR gate.

3. The apparatus as set forth in claim 1 wherein said means for generating a gating pulse includes:

a. a retriggerable one-shot multivibrator, and b. means for resetting said retriggerable one-shot multivibrator for generating a gating pulse each time a data change appears in said data train.

4. The apparatus as set forth in claim 3 wherein said means for resetting said retriggerable one-shot multivibrator is a capacitor that discharges responsive to data appearing in said data train.

* * * * *